(12) United States Patent
Bhumkar et al.

(10) Patent No.: US 8,756,510 B2
(45) Date of Patent: Jun. 17, 2014

(54) METHOD AND SYSTEM FOR DISPLAYING PHOTOS, VIDEOS, RSS AND OTHER MEDIA CONTENT IN FULL-SCREEN IMMERSIVE VIEW AND GRID-VIEW USING A BROWSER FEATURE

(75) Inventors: Soujanya Bhumkar, Palo Alto, CA (US); Mayank Mehta, Montreal (CA); Josh Schwarzapel, Palo Alto, CA (US); Austin Shoemaker, Stanford, CA (US)

(73) Assignee: Cooliris, Inc., San Francisco, CA (US)

( * ) Notice: Subject to any disclaimer, the term of this patent is extended or adjusted under 35 U.S.C. 154(b) by 565 days.

(21) Appl. No.: 11/751,540

(22) Filed: May 21, 2007

(65) Prior Publication Data
US 2008/0092054 A1 Apr. 17, 2008

Related U.S. Application Data

(60) Provisional application No. 60/829,840, filed on Oct. 17, 2006.

(51) Int. Cl.
*G06F 3/01* (2006.01)
(52) U.S. Cl.
USPC .......................................................... 715/739
(58) Field of Classification Search
USPC .......................................................... 715/739
See application file for complete search history.

(56) References Cited

U.S. PATENT DOCUMENTS

| | | | |
|---|---|---|---|
| 6,005,579 A | 12/1999 | Sugiyama et al. | |
| 7,734,631 B2 | 6/2010 | Richardson et al. | |
| 7,930,384 B1 | 4/2011 | Lester et al. | |
| 2004/0059659 A1* | 3/2004 | Safaei et al. | 705/35 |
| 2004/0139396 A1* | 7/2004 | Gelernter et al. | 715/515 |
| 2004/0205514 A1* | 10/2004 | Sommerer et al. | 715/501.1 |
| 2005/0257400 A1* | 11/2005 | Sommerer et al. | 36/13 |
| 2006/0053109 A1 | 3/2006 | Sudanagunta et al. | |
| 2006/0093998 A1 | 5/2006 | Vertegaal | |
| 2006/0110008 A1 | 5/2006 | Vertegaal et al. | |
| 2006/0156240 A1* | 7/2006 | Lemay et al. | 715/730 |
| 2006/0184872 A1* | 8/2006 | Dontcheva et al. | 715/512 |
| 2006/0282328 A1 | 12/2006 | Gerace et al. | |
| 2007/0022020 A1* | 1/2007 | Bernstein | 705/26 |
| 2007/0050251 A1 | 3/2007 | Jain et al. | |
| 2008/0022229 A1* | 1/2008 | Bhumkar et al. | 715/838 |
| 2008/0091658 A1 | 4/2008 | Kremen | |
| 2008/0275881 A1* | 11/2008 | Conn et al. | 707/10 |

* cited by examiner

*Primary Examiner* — Omar Abdul-Ali
*Assistant Examiner* — Haimei Jiang
(74) *Attorney, Agent, or Firm* — Fenwick & West LLP

(57) ABSTRACT

User-initiated or intelligently automated acquisition, extraction and presentation of content such as photos, videos, and/or other content (e.g., news stories, product displays, advertisements, etc.), from a Web site in a full-screen slideshow via client-side software, which may be implemented as a stand-alone application, an extension (a.k.a. plug-in, or add-on), a Web browser feature (a.k.a. function), or as an embedded component associated with the content.

18 Claims, 4 Drawing Sheets

... who have received flowers...
640 x 480 - 203k - jpg
www.darrenbarefoot.com

METHOD AND SYSTEM FOR DISPLAYING PHOTOS, VIDEOS, RSS AND OTHER MEDIA CONTENT IN FULL-SCREEN IMMERSIVE VIEW AND GRID-VIEW USING A BROWSER FEATURE

RELATED APPLICATIONS

This application is a nonprovisional of and claims priority to U.S. Provisional Patent Application No. 60/829,840, filed 17 Oct. 2006, which provisional application is incorporated herein by reference.

FIELD OF THE INVENTION

The present invention relates to systems and methods useful for presenting Web-based content in full-screen immersive and grid-like views on a personal computer or similar device, so as to provide users with enhanced content browsing/consuming experiences.

BACKGROUND

Conventional Web-based search engines configured to return images in response to search queries typically do so by returning thumbnail or other reduced size images. To view the full size images, the user must select individually the thumbnails and have the browser display the image. Often, these full-size images themselves are only small images or are displayed in connection with other content (e.g., text or other content on Web pages from which the images were extracted). This can be a tedious process which does not provide a fulfilling user experience.

Likewise, Web-based photo albums must often be viewed using small images. While some on-line photo albums provide for slideshow viewing, such slideshows are often less than full-screen and the overall user experience is again less than fully satisfying.

SUMMARY OF THE INVENTION

In varying embodiments, the present invention provides methods for displaying, in response to user input associated with a previously displayed reduced-size version of a content item (e.g., an image, video, text, etc.) obtained from an Internet source, a full-screen view of the content item retrieved from its Internet source, the full-screen view rendered in a viewer launched in response to the user input. The user input may be selection of a graphical element displayed in response to a cursor event, such as a mouse-over of the reduced-size version of the content item. The graphical element may be styled to indicate availability of a full-screen immersive viewing mode.

In further embodiments, the present invention provides means for initiating a full-screen slideshow of Internet-based content items in response to user input associated with a previously displayed reduced-size version of a first one of the content items obtained from an Internet source, the full-screen slideshow rendered in a viewer launched in response to the user input. As indicated above, the user input may be selection of a graphical element displayed in response to a cursor event, such as a mouse-over of the reduced-size version of the first one of the content items.

Still further embodiments of the present invention provide a computer-based presentation system configured to display a slideshow of images in a full-screen immersive view in response to user input associated with a previously displayed reduced-size version of one of the images as obtained from an Internet source. The presentation system may include a thumbnail strip configured to display thumbnail views of the images, and/or an information bar configured to display information concerning a present one of the images presented in the slideshow. For example, the information bar may be configured to display path information identifying a source of the present one of the images. The presentation system may also include means for a user to rate the images and/or to share the slideshow with others. Means for displaying content associated with search results as alternatives to images displayed as the slideshow may also be provided. In some cases, the computer-based presentation system may be configured to present a continuously generated sequence of media items modulated in real-time via user feedback in response to previously presented items.

These and other features and advantages of the present invention are described more fully below.

BRIEF DESCRIPTION OF THE DRAWINGS

The present invention is illustrated by way of example, and not limitation, in the figures of the accompanying drawings, in which.

DETAILED DESCRIPTION

Figure 1:
FIG. 1 is a screenshot showing a user interface for an image search engine.

Described herein are methods and systems which permit user-initiated or intelligently automated acquisition, extraction and presentation of content such as photos, videos, and/or other content (e.g., news stories, product displays, advertisements, etc.), from a Web site in a full-screen slideshow via client-side software, which may be implemented as a stand-alone application, an extension (a.k.a. plug-in, or add-on), a Web browser feature (a.k.a. function), or as an embedded component associated with the content. The present invention also allows a user to share the slideshow, in whole or in part, with other users who may or may not have downloaded the software. In some embodiments, the present invention also provides the capability to playback music during the slideshow, either directly from files stored on the user's computer or from files stored on a server accessed via a network or network of networks (e.g., the Internet).

In the case where one or more of the methods of the present invention are incorporated as a feature in a Web browser, a user interface enables the user to position a cursor over an image, video or other content on a Web site and initiate the full-screen mode by clicking on an icon that is superimposed or otherwise displayed over or in the vicinity of the content of interest. Other methods of activating the full-screen view are also possible, for example activating same from a preview window such as that described in U.S. Provisional Patent Application No. 60/753,783, filed Dec. 23, 2005, incorporated herein by reference, simply clicking a button in the browser (or performing a similar cursor control action), or initiating it from a display of recommended content. The browser feature which is an embodiment of the present invention is referred to below as PicLens™.

Recently, the use of browser features and widgets has steadily increased. Successful photo sites such as Flickr™, Zooomr™, Bubbleshare™, Rockyou™, etc. have prompted a substantial number of companies to release products in the area of photo viewing and sharing. Unlike these prior products, however, PicLens provides client-side software that leverages the capabilities of modern graphics processing units (GPUs) to provide users with an immersive, cinematic experience when viewing Internet content (such as photos, videos, news, RSS and other rich media), and a significantly enhanced medium through which they can consume and share this content. More specifically, PicLens enables users of a Web browser to view photos, videos and other rich content as a slideshow, grid view, shared surface, or other navigable modality in full-screen mode.

While some current on-line photo sites allow users to view their photos as a slideshow, most do not allow users to do so in a full-screen mode. The present invention solves this problem. Furthermore, the present invention allows users to navigate within such slideshows though straightforward keyboard and/or cursor control operations. The user can select the next video or photo by performing an appropriate keyboard or cursor control operation (e.g., clicking the spacebar or left/right arrow key on the keyboard) or using a remote control. To exit the slideshow, the user can perform another such action (e.g., click the close button and/or press any key other than those assigned to other functions). The present invention also allows users to initiate the full-screen view on any site whereas other applications or widgets are restricted and limited to working on only a few specific sites.

The present invention is particularly relevant to photo-centric, video-centric, and news-centric Web sites, and can also be applied as a rich messaging medium. Further, the present invention can be used to enhance the on-line retail experience by leveraging the powerful navigation and visualization capabilities built into PicLens. Full-screen 2D and/or 3D views of products, fast and intuitive navigation, and user-directed progressive information disclosure are examples of bow the invention could be used to enhance the discovery of store inventories. PicLens may allow on-line shoppers to listen to music from the music library on their computer or an Internet host while browsing in full-screen mode. This combination improves the quality of the shopping experience and makes it more personal and therefore memorable.

Refer now to FIG. 1, which is a screenshot 10 of a Web browser running on a personal computer. The browser has retrieved the home page 12 of an image search engine, which is useful for demonstration purposes. However, the present invention may be used with any Web site and is not limited to use with this image search engine or results retrieved thereby.

Figure 2:
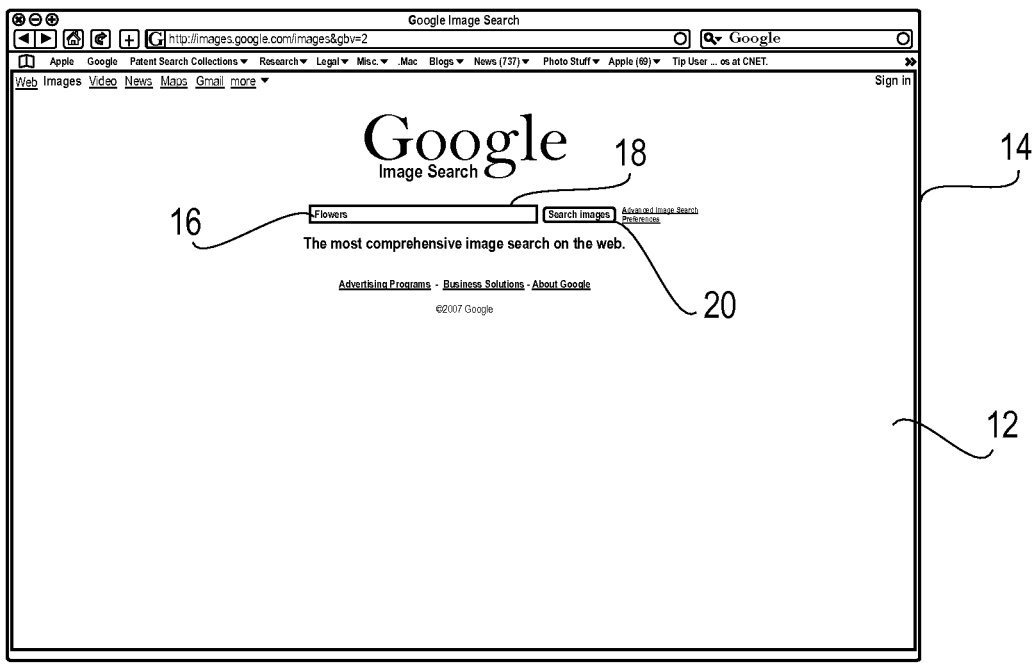
FIG. 2 is a screenshot showing a search term entered in the user interface shown in FIG. 1.

FIG. 2 shows a screenshot 14. A search term 16 has been typed in text box 18. When this search term is passed to the image search engine, for example in response to a cursor control operation such as a mouse click when the cursor is positioned over button 20, the search engine will parse the search term and return images which correspond thereto. The details of such operations are not critical to the present invention and merely represent a convenient way to retrieve images which can be presented in full screen immersive views, in accordance with the present invention.

Figure 3:
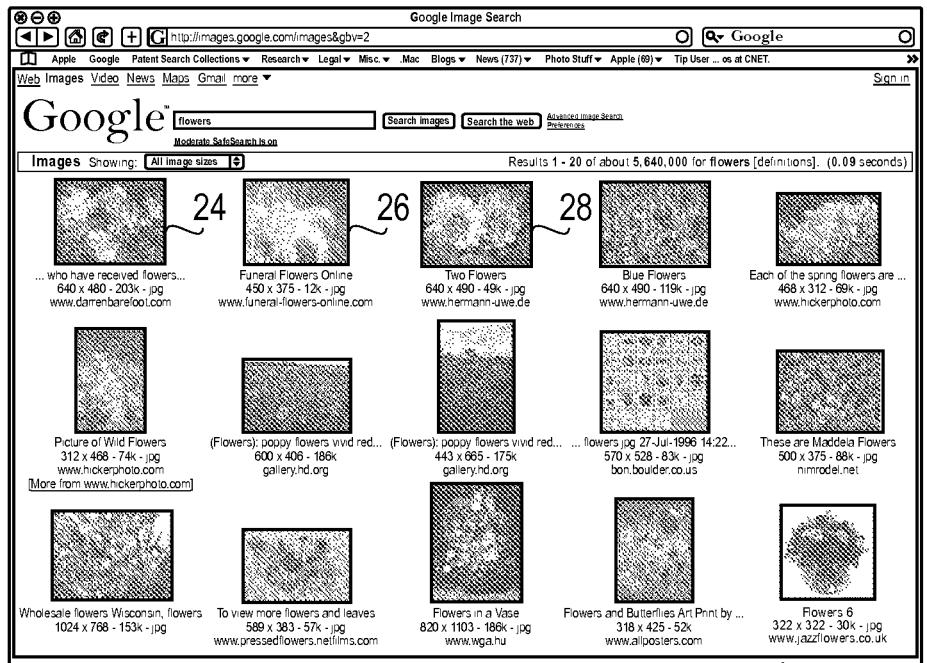
FIG. 3 is a screenshot showing results returned by the search engine in response to the search query being submitted.

FIG. 3 is a screenshot 22, showing the results returned by the search engine. Because this is an image search engine, the results are images that are indicative of the search term. In this case, the images 24, 26, 28, etc. are of flowers because the search term "flowers" was submitted to the search engine. As shown, there are multiple such images returned on a single results page; consequently each individual image is rather small.

Figure 4:
FIG. 4 shows one of the image results returned by the search engine in greater detail and also shows an icon superimposed over the image to indicate the availability of a full screen immersive viewing experience in accordance with embodiments of the present invention.

FIG. 4 is an enlarged view of image 24 that was returned as part of the search results. As with all of the search result, image 24 is taken from a different source that was at some point cataloged or otherwise referenced by the search engine. Metadata or other information associated with the image identified it as pertaining to flowers, hence, when the search term "flowers" was submitted to the search engine, image 24 was deemed to be relevant and so was returned.

Also shown in this enlarged view is cursor 30. This is the cursor of the user's personal computer within the browser window in which the search results page, and, hence, image 24, is displayed. As cursor 30 was positioned close to image 24, icon 32 was also displayed to the user. In this example, icon 32 is made to resemble an expansion of a small image to a full-screen view thereof. Of course, this is only an example and any visual indicator could be used. The purpose of icon 32 is to provide the user with a selectable tool or other indicator by which the user may initiate full-screen immersive views of content in accordance with the present invention. That is, if the user positions cursor 30 over icon 32 and performs a cursor control operation (e.g., such as a mouse click, double click or other operation), the PicLens viewer will be launched, allowing the user to navigate the associated content (in this case the images which were returned in response to the search request) in full-screen mode.

Figure 5:
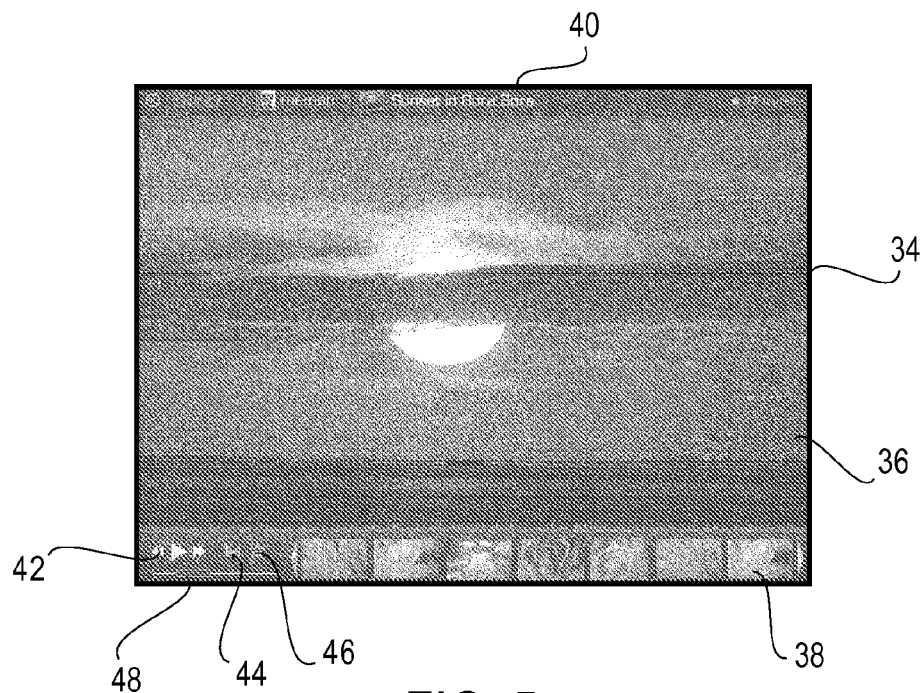
FIG. 5 is a screenshot illustrating an example of a full screen immersive view of an image along with other image viewing tools in accordance with embodiments of the present invention.

FIG. 5 is a screenshot 34 that illustrates an example of a full-screen slideshow provided by PicLens. In this particular example, the screenshot has been taken as the user utilizes PicLens to view photos on flickr.com. For example, these may be photos from the user's own flicker.com photo album. Notice that a current picture 36 is displayed in a full-screen (or nearly full-screen) view while other pictures in the user's photo album are displayed along an edge of the screen in a thumbnail strip 38. The user may navigate through these photos using keyboard/cursor operations as discussed above. As each individual image is selected, it is displayed in full-screen mode. Other details, such as titles and/or ratings of the content, EXIF, user tags, file path, image name and/or other metadata may be displayed in an information bar 40.

A slideshow of the images in the thumbnail strip may be initiated and controlled using the slideshow controls 42. These typically include options to play/pause, skip and review (i.e., rewind). Additional controls allow a user to send copies of images by email 44 and/or to assign ratings 46 to images as they are viewed. The slideshow controls may be part of the retractable thumbnail strip and allow the user to easily navigate in full-screen or grid-view mode without having to leave PicLens. This allows the user to select any content item out-of-order from whence to initiate the slideshow, thus providing a higher degree of control to the user.

A scroll bar 48 may be located at the bottom of the thumbnail strip, and is an indicator of where the viewed content is relative to the universe of the results. The scroll-distance may be linear or non-linear (to handle large quantities of content) and dragging the scroll bar in either direction enables the user to quickly navigate between disparate regions of the content sequence.

Various indicators associated with the scroll bar may provide at-a-glance information about the location of starred or other highly rated items within the content sequence. Such content of interest may be depicted by colored triangles or markers superimposed over the scroll bar, providing visual clues to the user to navigate to that region of the content. Other attributes of content items may be displayed as scroll bar markers with different appearances. Of course, these features are purely optional and are not critical to the present invention.

In one embodiment, PicLens is implemented as computer software (i.e., computer readable instructions embodied on a computer-readable medium) comprised of a platform independent core and a platform-specific abstraction layer, which allows the core to operate without knowledge of the specific environment within which it is running. The core subsumes functionality such as analyzing Internet content for viewable material, managing the transmission and caching of the content, rendering the full-screen user interface, and responding to input events. In one embodiment, the core uses the OpenGL interface to render content to the screen.

Various embodiments of PicLens are configured to work with Safari™ and Firefox™ browsers on the Mac™ platform (i.e., computer systems running the Mac OS™ available from Apple Computer, Inc. of Cupertino, Calif.), or browsers operating on the Microsoft Windows™ platform (including the Firefox™ and Internet Explorer™ browsers) or browsers operating on the Linux platform. In each instance, PicLens may be configured to pre-fetch images on a current Web page being displayed so as to ensure that a slideshow composed of such images is smooth and the transitions between the images are seamless. The pre-fetching is not necessarily limited to just images or media on the current page or Web site, but can be expanded to fetch images or media from other data sources (e.g., Web pages, XML feeds, server-generated content) as well. In addition to the PicLens normal user mode (i.e., full-screen immersive view), various options may be offered to users. Examples include a screensaver mode, which may be triggered when the user's computer has been inactive for a period of time, and a synchronized play on multiple displays/kiosk mode, for a user wanting to view content on multiple monitors.

PicLens includes multiple functions to enhance the overall user experience. JavaScript code may be used to display an icon (such as icon 32 described above) on any photo or media element on a Web page or other Web site element to indicate that the content is PicLens-enabled (i.e., capable of being viewed in the PicLens full-screen environment). Further, PicLens may be enabled for immersive viewing of diverse content types such as news, Web pages, photos or other images, videos, RSS feeds, or combinations of these or any other media types.

As indicated above, PicLens may display (e.g., via the information bar described above) the original location (e.g., URL, human-readable path, etc.) from which the content has been extracted. This information may represent attribution to the original content provider. The display of this information may be split up into various components, each of which may be selectable to allow the user to navigate to that level of hierarchy. For example, for the location "Flickr>Mamen>Monsoon", selecting "Flickr" take the user to Flickr's home page (e.g., via a Web browser), selecting "Mamen" would take the user to Mamen's page on Flickr.com, and selecting "Monsoon" would take the user to the specific page that has tagged the photo with the "monsoon" keyword.

PicLens may also be configured to allow users to view other content items in the collection being explored, for example at the bottom or side of the slideshow or in any other layout, such as a two or multi-dimensional grid. Users can navigate to other images/videos by selecting the associated thumbnails instead of proceeding sequentially through the images. Alternatively, these thumbnails can also be used to show high-resolution advertisements as either images, text, videos, or a combination thereof. The thumbnails may be dragable and manageable to organize the order of the content in the slideshow. Elegant switching between various views may be accomplished using three-dimensional effects or transitions to enhance visual impact.

One or more portions of the thumbnail strip 38 (e.g., on the right-most portion of the display) may be reserved for the display of advertisements by linking PicLens to an in-house or an external advertising network. Selecting (e.g., by mouse click) this specific thumbnail or the sponsored content may triggers the display of the ad or sponsored content, which may partially or completely occupy the display. Such a scheme is more fully described in U.S. Provisional Patent Application 60/829,841, filed 17 Oct. 2006, assigned to the assignee of the present invention and incorporated herein by reference.

PicLens may also be configured to include a toolbar (not shown in detail) that can display user-selected photos from a variety of Web sites such as Facebook™, Flickr™, Zooomr™, etc. During the slideshow the user can access a slideshow toolbar (e.g., by performing a cursor control operation to reveal the toolbar) to gain access to some or all of these functions. In some cases the toolbar will automatically hide if no user activity is detected for a predetermined period of time. The toolbar may contain a set of images organized as a list, stack, multi-page view, or other appropriate layout. Furthermore, the contents of the toolbar may change dynamically as a function of user actions or attention. Further, PicLens can be configured to read XML feeds (e.g., RSS, Atom, GData) provided by these sites, and use metadata included in such feeds to improve the process of selecting content to view in PicLens.

The attributes of content items viewed within PicLens implicitly place those items into a set with other items that share a given attribute value. For example, all photos taken on a certain date belong to a set for that day, and all photos tagged with a certain keyword belong to a set for that keyword. The present invention allows a user to navigate from a content item (or items) to a set of images sharing a given attribute (or attributes). In addition, the content item usually has an explicit location within a graph structure, most often defined by a content provider for the content under consideration. For example, a photo may belong to an album, which in turn may be part of a particular user's published collection. Finally, a content item may be deemed related to a set of other items, or other items may be recommended through some criteria. These attributes, as with intrinsic attributes of the content, form additional edges in the content graph. The present invention provides for displaying such navigation information in the form of a path, which shows the ancestors (defined by graph parents) of a currently viewed item, or as any embodiment of graph neighborhood visualization, e.g., a node-edge diagram or three-dimensional spatial representation.

PicLens may allow for a timeline-view for Web-based content. This may be an extension of a user's "Favorites" wherein PicLens may timestamp user interaction with content and thereby produce a timeline of viewed content presented to the user in an intuitive format. The invention may assign variable weighting to content with different access patterns, e.g. access count, access duration, level of interaction with content, inferred interest, and other attributes may alter the presentation of the content within a view aligned with the designated access pattern.

The PicLens full-screen viewer may be configured to include a text box or other input device for use as a search engine interface. The search may be limited to the content already imported into PicLens or may be directed to any locally stored or Web-based content. The search may be associated with recent full-screen slideshows and/or grid views and may allow users to search content by issuing a query, with results ranked, for example, by contextual similarity to the items currently or recently viewed. Alternatively or in addition, other ranking algorithms or probabilistic models may be used to produce the result set. The software may allow the user to vary the context sensitivity of the search; specifically, the result set may be biased toward recent browsing activity or other contextual information, it may ignore contextual factors, or it may interpolate between the two extremes of context-sensitivity. The user also may have the ability to select content sources with or without regard for contextual similarity. Alternatively, the user could also search through other sites and view the results within the full-screen mode.

The user need not necessarily exit PicLens or switch back to browser mode to view or search for new content as PicLens may be configured to pre-fetch or automatically fetch content from subsequent (and, if applicable, preceding) search result pages. This may lead to an extended full-screen viewing session, beyond that which would be possible using mere search result pages.

The user may also be provided with semantic search results that may be related to the original query. In order to provide a visual representation of the semantic or related searches, a tag cloud may be used. This tag cloud may provide an easy way for the user to refine a search query and dynamically see the results appear in PicLens. In one embodiment, a tag cloud may be integrated into the full-screen mode as a split-screen visual representation used to augment the display of search results and to facilitate query refinement.

A collaborative filtering mechanism may also be implemented wherein the user is permitted to view results ranked by inference about his/her preferences based on learning from explicit feedback (e.g., ranking, starring, etc.) or implicit feedback (e.g., time spent, level of interaction, etc.) from other users.

The present invention may be used to view text content, such as news, documents, etc., in an immersive mode. PicLens maintains a "current position" within the text, that the user is assumed to be reading. The user can easily indicate a change of focus using a cursor command, or through some other actuator. PicLens can automatically reformat (e.g., scroll, resize, etc.) the presentation to optimize the viewing of the current position. Furthermore, auxiliary content deemed relevant to the current focus may be shown alongside the text content. Examples of relevant auxiliary content include photos related to a news article, a map of a referenced location, profile information about an individual mentioned, etc. The user may navigate to related content or content linked from within the article or work being viewed, with the option of returning to the original context as in a traditional Web browser.

As indicated above, PicLens allows users to rate full-screen content using a rating control 46. The rating control may be included as part of the slideshow toolbar or may be included in a separate toolbar (e.g., displayable on the side of the screen). By rating (e.g., by assigning stars or other rating indicia) items or collections of items in the full-screen view or in a grid-view the user can accomplish multiple tasks, for example:

i. The "starred views" may be saved as hyperlinks to enable the user to visit the associated content item again easily.

ii. The starred views may be published to external sites, such as bookmarking sites, printing sites, social networking sites, etc.

iii. The starred views may be exported as part of a slideshow when/if the user decides to share a slideshow with someone else.

iv. A starred album/set may be saved for later viewing. In a bidirectional way, PicLens may allow the user to publish, print or upload the rich content, e.g., photos and videos, directly from the user's computer to a website using the website's APIs.

v. Starring may also be extended to photos or content that reside on the user's computer or personal storage. This can permit the user to watch the photos in a full-screen mode and use full capabilities of PicLens without invoking the browser.

PicLens may be configured to allow users to share images/videos with others using a share function along with a compressed representation (e.g., thumbnail or video clip) of the content item and optionally a personalized note. When the user initiates the share function (e.g., through the use of control button 44), the user may send anyone a link to the content, along with its thumbnail and a personalized note. The share function allows the content to be addressed to an individual or a group of individuals, and may deliver the content directly via e-mail, or by reference through a URL reference, store-and-forward, or peer-to-peer system.

The current invention is not limited to viewing slide shows on the Web. The slideshows generated using PicLens may be sent to mobile phones or PDAs using SMS, MMS, Bluetooth or other communications protocols. From within PicLens the slideshows may be sent to a television or to another computing device, such as a game console (e.g. Wii, Apple® TV). This may allow the user to watch slideshows using their respective remote controls to navigate within content sets.

PicLens can enable a rich messaging medium that allows users to participate in collaborative white-boarding, or to send messages (asynchronously or in real-time) in full-screen, or to send photos with messages in full-screen mode. PicLens may also permit a user to choose a photo and create a postcard, by giving the user the ability to attach a note to the photo (e.g., either directly on top of the photo or "behind" the photo by allowing the user to rotate the image on the screen to show a virtual reverse side thereof. In such a case, a postage icon superimposed on the virtual postcard may in fact be an advertisement or a logo. A music file may also be attached to this postcard.

Music can be, for some users, an important component of a slideshow. As mentioned above, PicLens supports the playback of music during a slideshow by playing music files from a local library of a local player on the user's computer or such files streamed over the Internet from an Internet server.

Figure 6:
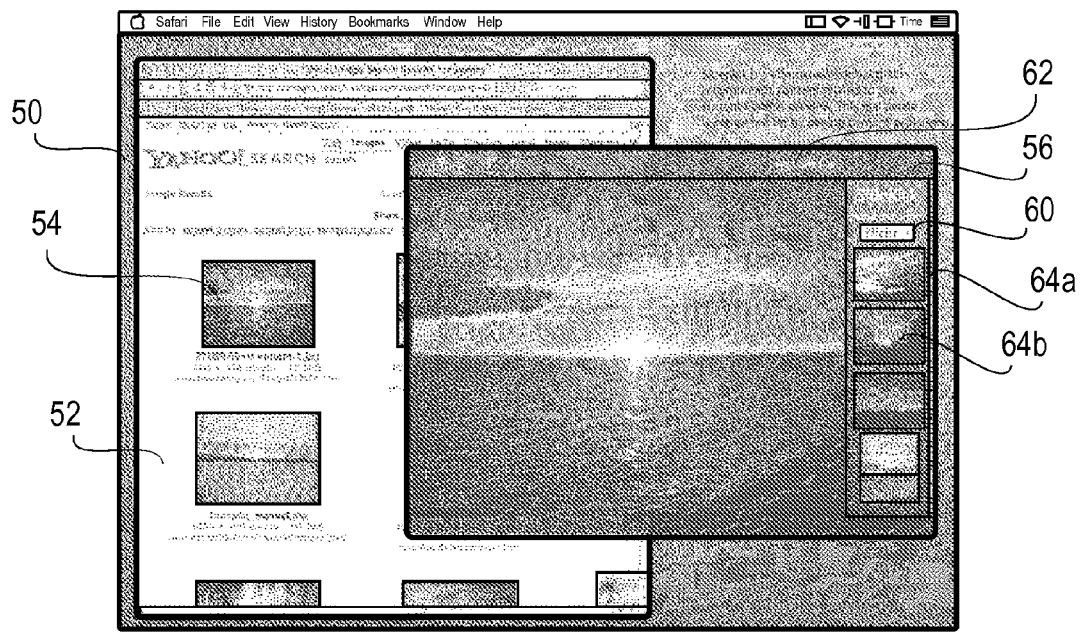
FIG. 6 illustrates an optional SideKick feature configured in accordance with embodiments of the present invention.

Referring now to FIG. 6, a screenshot 50 shows a first window 52 in which a browser is running. The browser has returned images in response to a search query. Image 54 is of a sunset.

Also shown in the screenshot 50 is a PicLens viewer 56 in which image 54 is now displayed in an immersive view 58 (expandable to full-screen size). Included in the PicLens viewer 56 is SideKick 60. The SideKick is an alternate content seeker and provider that is integrated in PicLens. It may also function as a recommendation engine.

To initiate SideKick, the user can select a Sidekick button (which would appear in place of the Hide SideKick button 62, for example, when SideKick is not displayed) or move the mouse to a designated portion of the screen. SideKick may appear as a drawer, for example opening from the side of the screen.

SideKick may display alternate search results (e.g., thumbnails 64a, 64b, etc.) or recommended content based on the content of the slideshow. For example, SideKick can analyze the content currently being displayed in the slideshow, then execute a search for similar content. The similarity may be determined based on metadata or tags associated with the present content being viewed or on other criteria (e.g., user-specified criteria). SideKick may suggest images/videos/rich content from the site that is being viewed or other sites (i.e., different from the one that the content for current slideshow is being taken from) and the content may be relevant to what the user is currently viewing, though not necessarily. In some cases, SideKick can be used to introduce ads and/or sponsored links (these advertisements may be text, images, video, interactive content or a combination of all/any the above and, upon selection, may be viewed in a full-screen mode as well).

PicLens also accommodates the use of stacks. The user can select images or media content in a normal browsing mode and add it to a stack. Adding content in normal browser mode to the stack accumulates it, pre-fetches it and stacks it so the user can initiate the full-screen slideshow mode to view the selected stacked content. PicLens may automatically name and classify the content and provide the user the ability to save the stack.

PicLens may permit a user community to create mash-ups and RSS aggregations in an unprecedented way. The sheer volume of information on the Internet makes it unlikely that any given content will find its way to the users most interested in experiencing it. The present invention proposes a solution to this problem by integrating continuous human feedback into a content routing network combining probabilistic systems modeling individual and aggregate preferences and response characteristics with traditional, deterministic routing mechanisms such as filters, merges, joins, and sorts. This approach to content routing leverages the power of individual users to select preferred content, thusly allowing that content to move up in the value chain for consumption by the rest of the user-base, potentially beginning with other users deemed most likely to appreciate the content given historical interest.

The influence of the opinion of an individual or group in determining the propagation of content through the routing network may be implicitly determined by the individual or group's success in predicting the relevance of specific subcategories of content to specific subpopulations of users. A key advantage of the present invention is the ability to combine human feedback at a local level to make routing decisions in the aggregate that would not be possible for humans to perform due to the sheer volume of information, or for machine to perform due to the lack of insight into human culture and the preferences of multitudinous subpopulations of users.

PicLens may be configured to include a contact list and may also allow for the importing of or use of a contact list from various online address books. It can maintain similar group structures as the ones imported from the metadata or allow a user to create different address groups and subgroups within PicLens itself. The ability to create groups and subgroups allows the user to collaborate with his/her personal network (in private mode) and allows for merging of photo or content streams from that network.

With this ability, PicLens users who are simultaneously present on the collaboration list can simply drop their pictures on a Shared Stack/Front Porch/Table that is attended by their co-collaborators and the collaboration function enables them to either broadcast or merge collective media streams in a chronological or random order and watch the slideshows in a group setting. This may allow for social or communal viewing of content with remotes and may allow users to mix videos with photos to create mash-ups which may be time-stamped.

PicLens provides users the ability to annotate or tag or comment a photo (or rich content) in a full-screen or a grid-view mode. This allows the user to mark a particular photo for future reference or send the comments over to his personal network. The user may also add special tags such as captions, comments, cross-groupings, locations (e.g., using geo-coded information), and themes. The ability to view the geo-tags or search by a particular geography or geo-tag is available as well. During the uploading of photos using a PicLens uploader, the data can be automatically uploaded based on the registration information of the user. The user can also assign keywords or tags using the PicLens tool that becomes specific to image search. This gives the user the ability to submit media RSS feeds that could allow webmasters to have more control over defining what the image is related to.

Additional features enabled by the present invention include the following:

I. Customizing PicLens with Skins: PicLens may function as an independent substitute to the browser. PicLens may be personalized by giving the user the choice to add skins or other external appearances as desired.

II. Payments in Full Screen for Photo Sales Sites, Ordering Prints from Third Party Providers: While providing the immersive view of content such as photos or stock photos, PicLens may be configured to permit the purchase or license of the content (especially the content being viewed) directly from within the full-screen mode. The ability to print on a local or network printer or the ability to send the content for professional printing on photographic paper or diverse substrates like T-shirts, mugs, etc., may also be provided.

III. Playing Games with Photos in PicLens: PicLens may be configured to allow a user to generate a photo collage or an online game that blends the ability of immersive viewing with entertainment. The game may be played by an individual user or played across a computer network (e.g. the Internet) between users who may or may not belong to the same group or social network. The key aspect of using content from the Web, such as photos or other rich media, to generate games would constitute a unique proposition.

IV. Substitute to Embedding as a way to Eliminate Widgets—Instead of creating widgets (which are compilations of content that are stored on a server by the widget provider and then displayed on the popular social networking sites), PicLens provides a unique way to accumulate various content data locations and create a compilation of URLs that may then be displayed as a slideshow. Importantly, by using PicLens the user can be retained on the site (social networking site or otherwise) when watching the slideshow as opposed to being redirected to the widget-maker's site.

PicLens may be configured to allow slideshows to be sent to users who may or may not have installed PicLens software on their own computer systems. For this group of users, who may typically be recipients of slideshows, PicLens can exploit the capabilities of a local content player (such as Flash™, etc.) to display the slideshows. Further, in the case of users who wish to embed PicLens slideshows in their profile pages on social networking sites, the interactivity may be specified by publisher/user. As a way to solve the storage issue of storage costs associated with large size of media files, PicLens may use the P2P method (private or fully distributed) of distributed storage instead of the traditional hosting models.

PicLens also provides for star field query refinement. Presently, a user may execute a query using a search engine, returning a static set of results, which may be browsed sequentially to discover items of interest. While this approach is useful, it is limited by the expressive power of the query language and the ability of the search engine to understand the context of the user's information need. Furthermore, the user cannot over-specify the search query, lest the results returned be too narrow to be useful.

The present invention addresses this problem by providing a user interface and probabilistic model that facilitate iterative query refinement in a novel way. Beginning with a set of media items (e.g., query results, fixed list, or random sample), the user is presented with a continuously generated sequence of media items modulated in real-time via user feedback in response to previously presented items. The user identifies photos of interest, alternatively or additionally identifying photos not of the desired class, and this feedback is applied to update a model of the users' information need as the interaction proceeds. As the model converges, the relevance of the presented media items improves.

As an extension of this system, multiple users may participate in a query refinement session, each contributing positive and/or negative feedback to the model, and accelerating the rate of convergence. Individual users may be presented with an identical sequence of items, wherein each participant's selections might be highlighted, for example, by the user's assigned color. Alternatively, participants may receive different streams of media items for which they are expected to provide feedback, though they contribute to and receive from the same probabilistic model.

This probabilistic model may use one or more learning and/or inference algorithms to improve its representation of both its users' immediate information needs and the joint probability distribution over "interesting" media items in general, which will augment its recommendation capabilities in future sessions. Examples of such algorithms include Bayesian networks, hard and soft clustering techniques, support vector machines (SVMs), collaborative filtering, random field inference and structured learning (MRF/CRF), and other probabilistic approaches to modeling a joint distribution.

The present invention can be implemented with an apparatus to perform the operations described herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, readonly memories (ROMs), random access memories (RAMs), EPROMs, EEPROMs, magnetic or optical cards, or any type of media suitable for storing electronic instructions, and each coupled to a computer system bus.

In view of the above, it should be appreciated that some portions of the detailed description presented above are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented with an apparatus to perform the operations described herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, readonly memories (ROMs), random access memories (RAMs), EPROMs, EEPROMs, magnetic or optical cards, or any type of media suitable for storing electronic instructions, and each coupled to a computer system bus.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of ordinary skill in the art will immediately appreciate that the invention can be practiced with computer system configurations other than those described below, including hand-held devices, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network. The required structure for a variety of these systems will appear from the description below.

Figure 7:
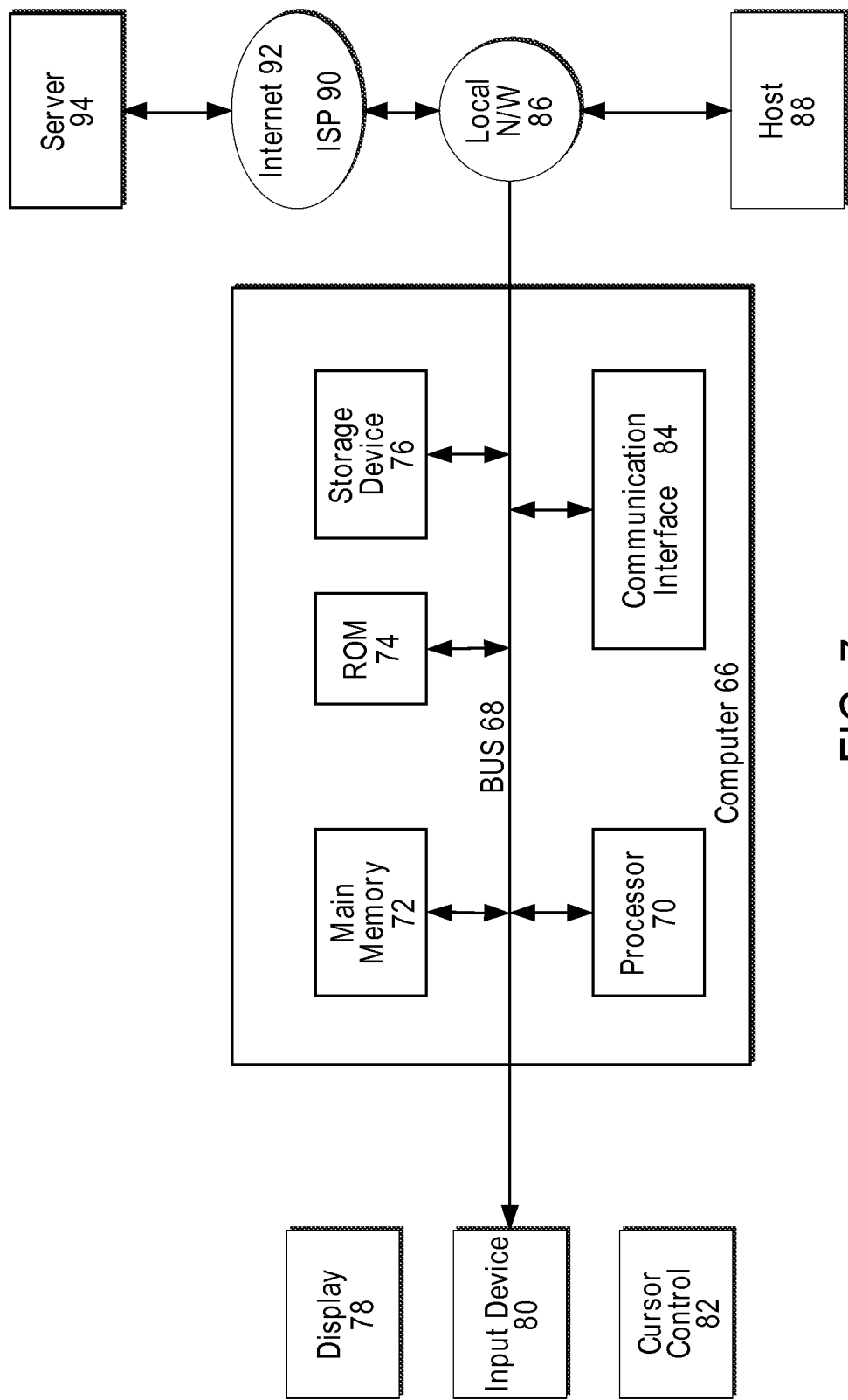
FIG. 7 illustrates an example of a computer system on which embodiments of the present invention may be installed and executed.

FIG. 7 is a block diagram illustrating an exemplary computer system 66 upon which an embodiment of the invention may be implemented. Computer system 66 includes a bus 68 or other communication mechanism for communicating information, and a processor 70 coupled with the bus 68 for processing information. Computer system 66 also includes a main memory 72, such as a random access memory (RAM) or other dynamic storage device, coupled to the bus for storing information and instructions to be executed by processor 70. Main memory 72 also may be used for storing temporary variables or other intermediate information during execution of instructions to be executed by processor 70. Execution of the sequences of instructions contained in the main memory causes the processor to perform the process steps described herein. In alternative embodiments, hard-wired circuitry may be used in place of or in combination with computer software instructions to implement the invention. Thus, embodiments of the invention are not limited to any specific combination of hardware circuitry and software.

Computer system 66 further includes a read only memory (ROM) 74 or other static storage device coupled to the bus for storing static information and instructions for the processor. A storage device 76, such as a magnetic disk, optical disk, floppy disk, flexible disk, hard disk, magnetic tape, or any other magnetic medium, CD-ROM, DVD-ROM, or other physical medium from which computer instructions can read, is provided and coupled to the bus for storing information and instructions.

Computer system 66 may be coupled via the bus 68 to a display 78, such as a cathode ray tube (CRT) or a flat panel display, for displaying information to a computer user. An input device 80, including alphanumeric and other keys, is coupled to the bus for communicating information and command selections to the processor. Another type of user input device is cursor control device 82, such as a mouse, a trackball, or cursor direction keys for communicating direction information and command selections to processor 70 and for controlling cursor movement on the display. This input device typically has two degrees of freedom in two axes, a first axis (e.g., x) and a second axis (e.g., y) allowing the device to specify positions in a plane.

Computer system 66 also includes a communication interface 84 coupled to the bus 68. Communication interface 84 provides a two-way data communication as is known. For example, communication interface 84 may be an integrated services digital network (ISDN) card or a modem to provide a data communication connection to a corresponding type of telephone line. As another example, communication interface 84 may be a local area network (LAN) card to provide a data communication connection to a compatible LAN. In one embodiment communication interface 84 is a wireless communication interface. In any implementation, communication interface 84 sends and receives electrical, electromagnetic or optical signals which carry digital data streams representing various types of information. For example, two or more computer systems 66 may be networked together in a conventional manner with each using a respective communication interface 84.

Communication interface 84 typically provides data communication through one or more networks to other data devices. For example, communication interface 84 may provide a connection through local network 86 to a host computer 88 or to data equipment operated by an Internet Service Provider (ISP) 90. ISP 90 in turn provides data communication services through the world wide packet data communication services through the Internet 92.

Computer system 66 can send messages and receive data, including program code, through the network(s) and communication interfaces described above. In the Internet example, a server 94 might transmit a requested code for an application program, images or other data through Internet 92, ISP 90, local network 86 and communication interface 84. In accordance with the invention, one such downloaded application provides for information discovery and visualization as described herein. The received code may be executed by processor 70 as it is received, and/or stored in storage device 76, or other non-volatile storage for later execution.

Thus, systems and methods useful for presenting Web-based content in full-screen immersive and grid-like views on a personal computer or similar device, so as to provide users with enhanced content browsing/consuming experiences have been described. Although discussed with reference to particular illustrated embodiments, however, the present invention should not be limited thereby. Instead, the invention should be measured only in terms of the claims, which follow.

What is claimed is:

1. A computer-implemented method comprising:
responsive to a cursor being positioned proximate to a previously displayed reduced-size version of a content item obtained from an Internet source, displaying an icon on top of the previously displayed reduced-size version of the content item;
responsive to a user input that positions the cursor over the icon and selects the icon while the cursor is still positioned over the icon, displaying a full-screen view of the content item retrieved from its Internet source, the full-screen view rendered in a viewer launched in response to the user input.

2. The computer-implemented method of claim 1, wherein the content item is a photo.

3. The computer-implemented method of claim 1, wherein the content item is a video item.

4. The computer-implemented method of claim 1, wherein the content item is text.

5. The computer-implemented method of claim 1, wherein the content item is an image.

6. The computer-implemented method of claim 1, wherein the icon is styled to indicate availability of a full-screen immersive viewing mode.

7. A computer-implemented method for displaying a full-screen view of a content item, comprising:
displaying a reduced-size version of a content item;
receiving a first user input that positions a cursor close to the reduced-size version of the content item or on top of the reduced-size version of the content item;
in response to receiving the first user input, displaying an icon on top of the reduced-size version of the content item;
receiving a second user input that positions the cursor over the icon;
receiving a third user input while the cursor is still positioned over the icon; and
in response to receiving the third user input, launching a viewer that displays a full-screen view of the content item.

8. The computer-implemented method of claim 7, wherein the content item was identified by a search engine in response to a search query.

9. The computer-implemented method of claim 7, wherein the third user input comprises a single click of a pointing device, a double click of a pointing device, or a key press.

10. The computer-implemented method of claim 7, wherein the icon resembles an expansion of a small image to a full-screen image.

11. A non-transitory computer-readable storage medium encoded with instructions that, when executed by a processor, cause the processor to perform a method for displaying a full-screen view of a content item, the method comprising:
displaying a reduced-size version of a content item;

receiving a first user input that positions a cursor close to the reduced-size version of the content item or on top of the reduced-size version of the content item;

in response to receiving the first user input, displaying an icon on top of the reduced-size version of the content item;

receiving a second user input that positions the cursor over the icon;

receiving a third user input while the cursor is still positioned over the icon; and in response to receiving the third user input, launching a viewer that displays a full-screen view of the content item.

12. The non-transitory computer-readable storage medium of claim 11, wherein the content item is an image.

13. The non-transitory computer-readable storage medium of claim 11, wherein the content item is a photo.

14. The non-transitory computer-readable storage medium of claim 11, wherein the content item is a video item.

15. The non-transitory computer-readable storage medium of claim 11, wherein the content item is text.

16. The non-transitory computer-readable storage medium of claim 11, wherein the content item was identified by a search engine in response to a search query.

17. The non-transitory computer-readable storage medium of claim 11, wherein the third user input comprises a single click of a pointing device, a double click of a pointing device, or a key press.

18. The non-transitory computer-readable storage medium of claim 11, wherein the icon resembles an expansion of a small image to a full-screen image.

\* \* \* \* \*